United States Patent Office 2,800,480
Patented July 23, 1957

2,800,480
KETONE DERIVATIVES OF 8-ALKYL-NORTROPANES

Charles L. Zirkle, Haddon Heights, N. J., assignor to Smith, Kline & French Laboratories, Philadelphia, Pa., a corporation of Pennsylvania No Drawing. Application July 1, 1955, Serial No. 519,648

6 Claims. (Cl. 260—292)

This invention relates to certain new ketone derivatives of 8-alkylnortropanes and salts thereof.

The new chemical compounds according to this invention have utility, for example, for treating the parasympathetic nervous system in providing, for example, antispasmodic and anticholinergic action and further have utility as antiemetics and for treating the central nervous system, for example, for treating psychotics and psychoneurotics. The compounds of this invention also have utility as intermediates for use in the preparation of compounds having utility for treating the parasympathetic nervous system in providing, for example, antispasmodic and anticholinergic action and further having utility as antiemetics and for treating the central nervous system, for example, for treating psychotics and psychoneurotics. Where the salts are used for therapeutic purposes, it will be obvious to those skilled in the art to select a non-toxic salt.

The new compounds according to this invention have the structure shown by the following formula:

FORMULA 1

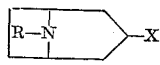

in which: R is a straight or branched chain lower alkyl radical having preferably 1 to 4 carbon atoms.

X is selected from the group consisting of —$COR_2$; —$CH_2COR_2$, which is preferred; —$CH_2CH_2COR_2$; $CH_2CH_2CH_2COR_2$; $R_2$ being selected from the group consisting of straight or branched lower alkyl radicals having preferably 1 to 6 carbon atoms, 2-thienyl, cycloalkylalkyl having 6 to 10 carbon atoms, cyclopentyl, cyclohexyl, phenyl, phenyl substituted with an alkyl group having not in excess of 4 carbon atoms, phenyl substituted with an alkoxy group having not in excess of 4 carbon atoms.

More succinctly, the new compounds of this invention have the structure shown in the following formula:

FORMULA 2

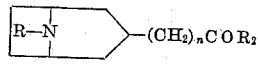

in which: R and $R_2$ are as given above and $n$ is from 0 to 3, preferably 1.

Where hereinafter the symbols R, $R_2$ and $n$ are mentioned in the description, they will indicate the substituents indicated for them in connection with the above general formulas.

The organic and inorganic salts of the base of the above formulas contemplated by this invention include by way of example salts of the base formed with organic acids such as, for example, tartaric, maleic, camphorsulfonic, citric, acetic, propionic, butyric, succinic, glutaric, adipic, ascorbic, lactic, levulinic, malic, mandelic, cinnamic, gluconic, methanesulfonic, benzene sulfonic, fumaric, citraconic, itaconic, lauric, stearic, myristic, palmitic, linoleic, aspartic and sulfoacetic, and inorganic acids such as, for example, hydrochloric, hydrobromic, sulfuric, sulfamic, phosphoric, nitric, etc. and can readily be produced by reacting the free base with the appropriate acid.

This invention also embraces quaternary ammonium salts formed with, for example, organic esters of sulfuric, hydrohalic and aromatic sulfonic acids. Exemplary of such esters are methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene-sulfonate, ethyl toluene-sulfonate, and the like.

The quaternary ammonium salts will be prepared by treating a solution of the base of the above structural formulas in a suitable solvent such as chloroform, acetone, benzene, toluene or ether with an excess of an organic ester of sulfuric, hydrohalic or aromatic sulfonic acid. This reaction will be carried out most advantageously at a temperature in the range of from about 25° C. to about 115° C.

The compounds in accordance with this invention are prepared from the carboxylic acid or ester derivative of 8-alkylnortropanes having the structure represented by the following formula:

FORMULA 3

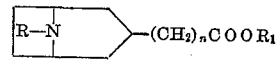

in which: R is a straight or branched chain lower alkyl radical having preferably 1 to 4 carbon atoms.

$R_1$ is hydrogen or a straight or branched chain lower alkyl radical having preferably 1 to 4 carbon atoms.

More specifically, the compounds of this invention (Formula 1) are readily formed by reacting the Grignard derivative prepared from lower alkyl bromides having 1 to 6 carbon atoms, phenyl bromide, alkyl substituted phenyl bromide, 2-bromothiophene, alkoxy substituted phenyl bromide, cyclohexyl bromide, cyclopentyl bromide or cycloalkyl-alkyl bromide having from 6 to 10 carbon atoms with one of the esters of Formula 3 above. It is desirable to carry out the Grignard reaction in a solvent such as diethyl ether, using a molar excess of the Grignard reagent. The resulting amino ketones of this invention will be isolated and purified by distillation or by the crystallization of the organic or inorganic acid salts from a suitable solvent.

Except for the cyclohexyl or cyclopentyl derivatives, the compounds of this invention are also readily formed by the reaction of the lithium derivative prepared from lower alkyl bromides having 1 to 6 carbon atoms, phenyl bromide, alkyl or alkoxy substituted phenyl bromide, 2-bromothiophene or cycloalkyl-alkyl bromides having 6 to 10 carbon atoms as above with one of the carboxylic acids of Formula 3 above. This reaction is carried out using a solvent such as ethyl ether and preferably using an excess of the lithium reagent.

The starting material, esters and acids of Formula 3 above, can variously be obtained from known compounds by utilizing one or more of the following methods:

METHOD A

The compounds of Formula 3 where $n$ is 0 are obtained by the reaction sequence outlined below:

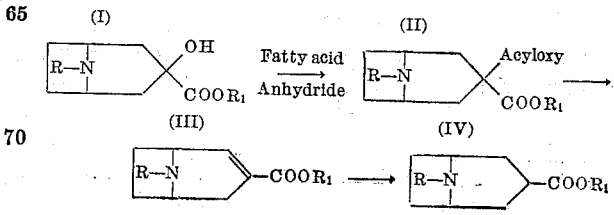

The acyloxy ester (II) is obtained in good yield when the hydroxy ester (I), preferably with R₁=methyl, is treated with an excess of lower fatty acid anhydride having preferably 4 to 8 carbon atoms, advantageously with an excess of acetic anhydride. Pyrolysis of the acyloxy ester (II) using a temperature of about 350° C. to about 500° C. by passage of the acyloxy ester through a column packed with, for example, inert heat resistant beads, tubes or rods such as clay or heat resistant glass (Pyrex) beads, tubes or rods, and swept with nitrogen, and heated to a temperature in the range of about 350° C. to about 500° C. furnishes the unsaturated ester (III). The saturated ester (IV, R₁=lower alkyl) is obtained by hydrogenation of the unsaturated ester (III) using, for example, a noble metal catalyst such as platinum or palladium or a Raney nickel catalyst and at room temperature and atmospheric pressure or at elevated temperatures and pressures. The acid (IV, R₁=H) is obtained as the hydrochloride salt by refluxing the saturated ester with an excess of hydrochloric acid and then removing the excess acid in vacuo. The thus formed acid is readily esterified to produce the ethyl, propyl, butyl esters, etc. using ethanol, propanol, butanol, etc. respectively.

METHOD B

The preparation of the compounds of Formula 3 above where $n$ is from 1 to 3 is illustrated for the preparation of these compounds where $n=1$ in the scheme below:

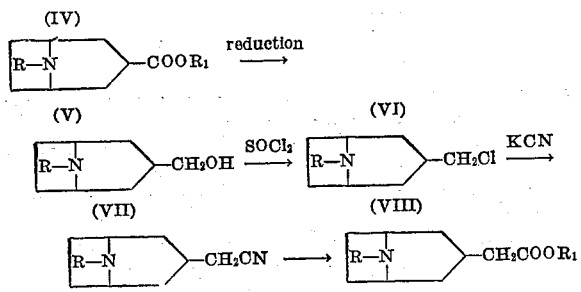

The carboxylic acid or ester (IV) is reduced to the carbinol (V) using, for example, lithium aluminum hydride, or in the case of the esters, using sodium-alcohol combinations, or catalytic hydrogenation. The halide (VI), in the form of its hydrochloride salt, is obtained from the reaction of (V) with excess thionyl chloride. The halide base (VI) is converted to the nitrile (VII) by reaction with sodium or potassium cyanide preferably in an aqueous alcohol medium. The acid (VIII, R₁=H) is formed by acidic or basic hydrolysis of the nitrile (VII). The ester (VIII, R₁=lower alkyl) may be obtained by esterification of the acid (VIII, R₁=H) or alternatively by alcoholysis of the nitrile (VII).

It will be apparent to those skilled in the art that the application of the above reaction sequence to the ester or acid (VIII) will furnish the ester or acid having the following structure:

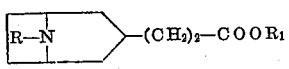

and that in turn when this compound is subjected to the above reaction sequence a compound having the following structural formula will result:

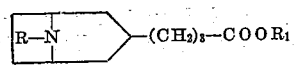

METHOD C

By way of further example, the compounds of formula 3 above where $n$ is 1 may also be readily made by the reaction sequence outlined below:

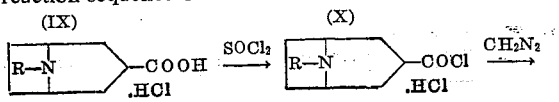

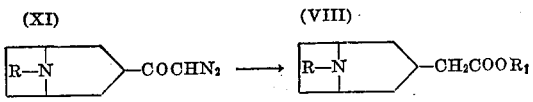

The hydrochloride of the amino acid (IX) is converted to the acid chloride hydrochloride (X) which in turn yields the diazoketone (XI) by reaction with a large excess of diazomethane. The diazoketone (XI) is converted in the presence of a suitable catalyst, as, for example, silver oxide and a suitable medium such as, for example, methanol, ethanol, propanol, or butanol, to the ester (VIII). Where an aqueous medium is used the carboxylic acid (VIII) is produced. Similarly, the hydrochloride of the amino acid

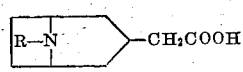

when used as the starting material in the above described reaction sequence will form the compounds of Formula 3 above where $n=2$. Similarly the hydrochloride of the compound of Formula 3 where $n=2$ can then in turn be used as the starting material in the reaction sequence given above to form the compounds of Formula 3 above where $n=3$.

METHOD D

The compounds of Formula 3 above where $n=1$ may also be formed by the following reaction sequence:

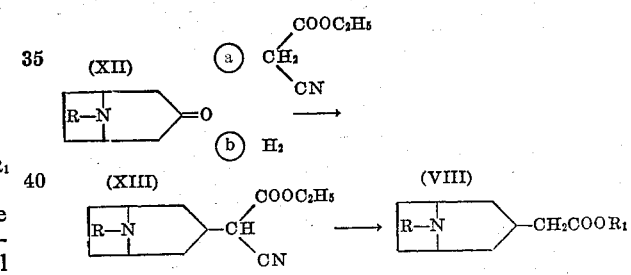

An N-alkyl-nor-tropinone (XII) is reacted with a lower alkyl ester of cyanoacetic acid such as methyl, ethyl or butyl, cyanoacetate (the ethyl ester being specifically illustrated above) using as a solvent, for example, a lower fatty acid such as propionic, acetic or butyric acid and preferably in the presence of a catalyst which is a salt of a weak acid and a weak base, for example, ammonium acetate. The thus formed unsaturated cyano ester is then hydrogenated at a temperature of about 40° to 80° C. in the presence of a noble metal catalyst such as platinum or palladium to the N-lower-alkyl-3-[(α-cyano-α-carbalkoxy)-methyl]-nortropane. Saturated cyano ester (XIII) is hydrolyzed and decarboxylated to 3(N-alkyl-nortropane) acetic acid by heating with an excess of a volatile mineral acid such as a hydrohalic acid such as hydrobromic or hydrochloric acid. The removal of the excess mineral acid by distillation in vacuo leaves the amino acid salt (VIII, R₁=H) which can readily be esterified with a lower aliphatic alcohol in the presence of a strong acid, for example, a hydrohalic acid such as hydrochloric or hydrobromic acid, sulfuric acid or para toluenesulfonic acid.

UTILITY AS INTERMEDIATES

The compounds of this invention have utility as intermediates in the preparation of tertiary alcohol derivatives having the structure represented by the following formula and having utility, for example, for treating the parasympathetic nervous system in providing, for example, antispasmodic and anticholinergic action and further having utility as antiemetics and for treating the central nervous system, for example, for treating psychotics and psychoneurotics:

FORMULA 4

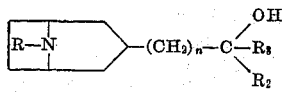

in which: R is a straight or branched chain lower alkyl radical having preferably from 1 to 4 carbon atoms.

R₂ and R₃ are selected from the group consisting of straight or branched chain lower alkyl groups having preferably from 1 to 6 carbon atoms, cycloalkyl having from 5 to 6 carbon atoms, cycloalkyl-alkyl having from 6 to 10 carbon atoms, 2-thienyl, 2-pyridyl, phenyl and phenyl substituted with alkyl groups having not in excess of 4 carbon atoms and phenyl substituted with alkoxy groups having not in excess of 4 carbon atoms.

$n$ is from 0 to 3.

As is apparent from the above formula, the carbon atom or carbon chain carrying the tertiary hydroxyl group will be attached to the 3 position of the tropane nucleus.

Where hereinafter used in the description R₃ will be as defined above.

The formation of tertiary alcohol derivatives of 8-alkylnortropanes of Formula 4 is illustrated by the following general scheme:

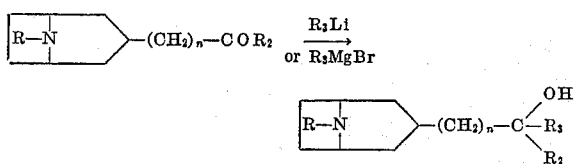

The ketone is reacted variously with the lithium or magnesium derivative prepared from lower alkyl bromides, phenyl bromides, substituted phenyl bromides, 2-bromopyridine, cycloalkylalkyl bromides having from 6 to 10 carbon atoms, 2-bromothiophene, cyclohexyl bromide and cyclopentyl bromide depending on the end product desired and desirably in a solvent such as diethyl ether and using an excess of the lithium or magnesium reagent. In general, superior yields are achieved using the lithium derivatives.

The invention will be further clarified by reference to the following specific examples:

*Example 1.—2-thienyl 3-tropane ketone*

*Methyl 3 - (3-acetoxytropane)carboxylate (α-ecgonine acetate).*—A solution of 10 g. of methyl 3-(3-hydroxytropane)-carboxylate (methyl α-ecgonine) (Willstatter, Ber. 29 1575 (1896)) in 50 ml. of acetic anhydride is heated at 100° C. for 4 hours. The excess acetic anhydride and acetic acid are removed in vacuo and the residue is poured into ice water. The mixture is saturated with potassium carbonate and the product extracted with ether. After evaporation of ether the crude methyl 3-(3-acetoxytropane)-carboxylate is purified by distillation; B. P. 162–165° C. (15 mm.); M. P. 66–67° C. The picrate after recrystallization from alcohol-water mixture melts at 215–217.5° C.

*Methyl 3-(2-tropene)carboxylate.*—Methly 3-(3-acetoxytropane)-carboxylate (29 g.) is added dropwise over a 7 min. period to a vertical Pyrex tube (25 mm. diameter), packed for a length of 8 in. with ¼ to ½ in. pieces of Pyrex tubing of 7 mm. diameter, and heated at 420° C. During the addition, the apparatus is swept out with nitrogen. The product, collected by means of an efficient condenser at the bottom of the tube, is dissolved in dilute hydrochloric acid and the mixture is extracted with three portions of ether. The aqueous acid solution is saturated with potassium carbonate and the product removed by extraction with ether. Distillation of the ether solution gives methyl 3-(2-tropene)-carboxylate as a pale yellow liquid, B. P. 131–134° C. (15 mm.); $n_D^{25.5}$ 1.4998. The picrate after recrystallization from water melts at 207–208° C.

*Methyl 3-tropanecarboxylate.*—Methyl 3-(2-tropene)-carboxylate (13 g.) dissolved in 100 ml. of methanol is hydrogenated over 5 g. of Raney nickel catalyst at 50 p. s. i. pressure at room temperature until hydrogen absorption ceases. Distillation of the mixture, after removal of the catalyst by filtration, gives methyl 3-tropanecarboxylate as a colorless liquid, B. P. 128–132° C. (18 mm.); $n_D^{25}$ 1.4819.

*2-thienyl 3-tropane ketone.*—A solution of 2-thienyl magnesium bromide in 100 ml. of ether is prepared in the usual way from 16.6 g. of 2-bromothiophene and 2.4 g. of magnesium. To the stirred solution, cooled to 0° C. is slowly added a solution of 6.3 g. of methyl 3-tropanecarboxylate in 20 ml. of ether. After the addition the mixture is stirred for two hours at room temperature. The mixture is cooled to 0° C., and an aqueous solution of 97 g. of the sodium salt of ethylenediamine tetraacetic acid added slowly with stirring. The ether layer is removed and the aqueous mixture extracted with several portions of ether. Evaporation of the ether gives the crude product as a thick brown oil. The oil is dissolved in dilute hydrochloric acid and the solution extracted with two portions of ether. The acid solution is saturated with potassium carbonate and the mixture extracted with several portions of chloroform. Distillation of the chloroform solution under reduced pressure gives 2-thienyl 3-tropane ketone as a colorless oil, B. P., 142–143° C. (0.4 mm.).

*Di-(2-thienyl)-3-tropanecarbinol.*—Exemplifying utility, as an intermediate, a solution of 2-thienyl lithium is prepared by adding 1.3 g. of thiophene to a solution of phenyl lithium in 15 ml. of ether, prepared in the usual way from 2.4 g. of bromobenzene and 0.2 g. of lithium, and heating the mixture at reflux temperature for 2 hours. The mixture is cooled to −20° C. and 1.2 g. of 2-thienyl 3-tropane ketone in 5 ml. of ether is added slowly with stirring. After the addition the mixture is stirred 2 hours at room temperature and then is decomposed by addition of 15 ml. of water. The ether layer is separated and the aqueous phase is extracted with two portions of chloroform. Evaporation of solvents from the combined ether and chloroform extracts gives solid crude di-(2-thienyl)-3-tropanecarbinol, which, after recrystallization from ethyl acetate, melts at 157–159° C.

*Example 2.—Phenyl 3-tropanemethyl ketone*

*Ethyl cyano-3-tropaneacetate.*—A mixture of 13.9 g. of tropinone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 50° C. Hydrogenation is interrupted when one mole equivalent of hydrogen has been absorbed. After removal of the catalyst, the solution is evaporated in vacuo on a warm water bath. The amber oily residue is dissolved in dilute hydrochloric acid and the solution extracted with ether. The acid solution is neutralized and saturated with potassium carbonate and the product removed by extraction with ether. Distillation of the ether solution gives ethyl cyano-3-tropaneacetate as a yellow oil, B. P. 116–118° C. (0.3 mm.); $n_D^{24}$ 1.4942.

*Ethyl 3-tropaneacetate.*—A solution of 8 g. of ethyl cyano-3-tropaneacetate in 30 ml. of 37% hydrochloric acid is refluxed for 13 hours. The solution is evaporated in vacuo and the residue dried by successive addition and removal by distillation of absolute ethanol. The 3-tropane acetic acid hydrochloride thus obtained is esterified by allowing its solution in 50 ml. of dry ethanol saturated with hydrogen chloride to stand 3 days at room temperature. Most of the alcohol is distilled in vacuo, cold concentrated potassium hydroxide solution added to the residue and the product removed by extraction with ether. After distillation of the solvent, ethyl 3- tropaneacetate is obtained as a colorless oil distilling at 104–105° C. (2 mm.); $n_D^{25}$ 1.4774.

*Phenyl 3-tropanemethyl ketone.*—An ether solution of phenyl magnesium bromide is prepared in the usual way from 181 g. of bromobenzene and 27 g. of magnesium. The solution is cooled to 0° C. and, with stirring, 60 g. of ethyl 3-tropaneacetate dissolved in 100 ml. of ether is added slowly. After the addition the mixture is stirred for one hour at room temperature and then heated at reflux temperature for 1.5 hours. The mixture is added to dilute hydrobromic acid at 0° C. and the ether layer withdrawn. The aqueous acid solution is made basic by addition of concentrated ammonium hydroxide solution and the mixture extracted with several portions of chloroform. Distillation of the chloroform solution gives phenyl 3-tropanemethyl ketone boiling at 138–143° C. (0.2 mm.). Upon standing the product crystallizes.

The hydrochloride salt of the amino ketone melts at 231–232° C. after recrystallization from a mixture of ethanol and butanone.

*1 - phenyl - 1 - (2 - pyridyl) - 2 - (3 - tropane)ethanol.*—Exemplifying utility as an intermediate, a solution of n-butyl lithium in 25 ml. of ether is prepared in the usual way from 3.7 g. of n-butyl chloride and 0.7 g. of lithium. With stirring the solution is cooled to −45° C. and 5.5 g. of 2-bromopyridine dissolved in 10 ml. of ether is added slowly. After the addition, the mixture is stirred 10 minutes and 2.5 g. of phenyl 3-tropanemethyl ketone dissolved in 30 ml. of ether is added slowly. The mixture is then stirred 15 minutes at −15° C. Water (50 ml.) is added slowly and the mixture is stirred vigorously for 15 minutes. A yellow solid forms which is collected on a filter and washed with ether. The ether layer in the filtrate is separated and saved. The solid is stirred vigorously in a mixture of equal volumes of chloroform and water until two clear layers result. The chloroform layer is removed and combined with the ether solution above. Evaporation of the solvents in vacuo gives a yellow oil which crystallizes when stirred with ether. By recrystallization of the product from ethyl acetate, 1-phenyl-1-(2-pyridyl)-2-(3-tropane)ethanol is obtained as white crystals melting at 117–118.5° C.

Example 3.—Phenyl 3-tropanemethyl ketone

A solution of phenyl lithium in 100 ml. of ether is prepared in the usual way under nitrogen from 31.4 g. of bromobenzene and 2.8 g. of lithium. In one portion, 11 g. of 3-tropaneacetic acid hydrochloride (made as in Example 2) is added and the mixture is heated to reflux temperature with stirring. The heat source is removed and the mixture allowed to reflux spontaneously until the reaction subsides. Heating and stirring are then continued for nine hours. The mixture is cooled to 0° C. and decomposed by the slow addition of 50 ml. of water. The ether layer is removed, the aqueous layer extracted with ether and the extracts are dried over sodium sulfate. Passage of hydrogen chloride into the ether solution precipitates the hydrochloride salt of phenyl 3-tropanemethyl ketone. The crude salt, after washing with ether, is reconverted to the base by treatment with ammonium hydroxide and extraction of the product with ether. Distillation of the ether extract under reduced pressure gives phenyl 3-tropanemethyl ketone, B. P. 138–141° C. (0.2 mm.).

Example 4.—Cyclohexyl 3-tropanemethyl ketone

An ether solution of cyclohexyl magnesium bromide is prepared in the usual way from 11.5 g. of magnesium and 77 g. of cyclohexyl bromide. To the stirred solution cooled at 0° C. is added slowly 25 g. of ethyl 3-tropaneacetate (made as in Example 2) dissolved in 45 ml. of ether. The mixture is stirred at 0° C. for 0.5 hr. and then at room temperature for 2.5 hours. The mixture is again cooled to 0° C. and a solution of 483 g. of the sodium salt of ethylene diamine tetraacetic acid in 590 ml. of water is added slowly with stirring. The ether layer is removed and the aqueous mixture is extracted with several portions of ether. Distillation of the ether solution under reduced pressure gives cyclohexyl 3-tropanemethyl ketone; B. P. 142–153° C. (0.8 to 1.1 mm.).

*1 - cyclohexyl - 1 - phenyl - 2 - (3 - tropane)ethanol.*—Exemplifying utility as an intermediate, a solution of phenyl lithium in 130 ml. of ether is prepared in the usual way from 1.6 g. of lithium and 18 g. of bromobenzene. With stirring 10 g. of cyclohexyl 3-tropanemethyl ketone dissolved in 40 ml. of ether is slowly added to the solution cooled to 0° C. The mixture is stirred one hour at 0° C. and 3 hours at room temperature. Ice water is then slowly added and the resulting mixture stirred vigorously for 30 minutes. The ether layer is separated and the aqueous layer extracted with ether. On evaporation of the ether solution (dried over sodium sulfate) a clear oil is obtained which crystallizes when stirred with a small volume of petroleum ether. Recrystallization of the white solid from ethyl acetate gives transparent crystals of 1-cyclohexyl-1-phenyl-2-(3-tropane)-ethanol, M. P. 139–140.5° C.

Example 5.—2-cyclohexylethyl 3-tropanemethyl ketone

An ether solution of cyclohexylethyl magnesium bromide is prepared in th usual way from 6.3 g. of magnesium and 51.8 g. of 2-bromoethylcyclohexane. To the stirred solution cooled to 0° C. is added slowly 15 g. of ethyl 3-tropaneacetate (made as in Example 2) dissolved in 30 ml. of ether. The mixture is stirred at 0° C. for 0.5 hr. and then at room temperature for 2.5 hours. The mixture is again cooled to 0° C. and a solution of 290 g. of the sodium salt of ethylene diamine tetraacetic acid in 345 ml. of water added slowly with stirring. The ether layer is removed and the aqueous mixture extracted with several portions of ether. Distillation of the ether solution under reduced pressure gives cyclohexylethyl 3-tropanemethyl ketone; B. P. 157–164° C. (0.7 mm.); $n_D^{24.5}$ 1.5010. The picrate of the base melts at 148–150° C. after recrystallization from dilute ethanol.

*1 - (2 - cyclohexylethyl) - 1 - phenyl - 2 - (3 - tropane)ethanol.*—Exemplifying utility as an intermediate, a solution of phenyl lithium in 75 ml. of ether is prepared in the usual way from 0.8 g. of lithium and 9.4 g. of bromobenzene. With stirring 7.7 g. of 2-cyclohexylethyl 3-tropanemethyl ketone dissolved in 20 ml. of ether is slowly added to the solution cooled to 0° C. The mixture is stirred one hour at 0° C. and 3 hours at room temperature. Ice water is then slowly added and the resulting mixture stirred vigorously for 30 minutes. The ether layer is separated and the aqueous layer extracted with ether. On evaporation of the ether solution (dried over sodium sulfate) a clear oil is obtained which crystallizes when stirred with a small volume of petroleum ether. Recrystallization of the white solid from ethyl acetate gives transparent crystals of 1-(2-cyclohexylethyl) - 1 - phenyl - 2 - (3 - tropane) - ethanol melting at 104–106° C.

Example 6.—P-anisyl 3-(N-isopropylnortropane)methyl ketone

*Methyl 3-(N-isopropylnortropane)acetate.*—A mixture of 16.7 g. of N-isopropylnortropanone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 60° C. Hydrogenation is interrupted when one mole equivalent of hydrogen has been absorbed. After removal of the catalyst, the solution is evaporated in vacuo on a warm water bath. The oily residue is dissolved in concentrated hydrochloric acid and the solution is extracted with several portions of ether. The aqueous acid solution is refluxed 12 hours, evaporated in vacuo, and the residue is dried by successive addition and removal by distillation of dry benzene. The crude 3-(N-isopropylnortropane)acetic acid hydrochloride so obtained is esterified by allowing its solution in 100 ml. of anhydrous methanol saturated with hydrogen chloride to stand 3 days at room temperature. Most of the methanol is distilled under reduced pressure, cold concentrated potassium hydroxide solution is added to the residue, and the product is removed by extraction with ether. Distillation of the ether solution in vacuo gives methyl 3-(N-isopropylnortropane)-acetate as a colorless oil distilling at 124–127° C. (0.3 mm.).

*p-Anisyl 3-(N-isopropylnortropane)methyl ketone.*—A solution of p-anisyl magnesium bromide in 200 ml. of ether is prepared from 28 g. of p-bromoanisole and 3.7 g. of magnesium in the usual way. The solution is cooled to 0° C. and 11.3 g. of methyl 3-(N-isopropylnortropane)-acetate dissolved in 25 ml. of ether is added slowly with stirring. After the addition the mixture is stirred for one hour at room temperature and is then heated at reflux temperature for 2 hours. The mixture is cooled to 0° C. and a solution of 135 g. of the sodium salt of ethylenediamine tetraacetic acid in 180 ml. of water is added slowly with stirring. The ether layer is removed and the aqueous layer is extracted with two portions of chloroform. Evaporation of the solvents from the combined extracts gives the crude product as a thick oil which is purified by distillation under reduced pressure. p-Anisyl 3-(N-isopropylnortropane)-methyl ketone obtained in this way boils at 160–164° C. (0.2 mm.) and crystallizes as a white solid upon standing.

*1 - (p - anisyl) - 1 - phenyl - 2-[3-(N-isopropylnortropane)]-ethanol.*—Exemplifying utility as an intermediate, to a solution of phenyl lithium in 45 ml. ether, prepared in the usual way from 7.9 g. of bromobenzene and 0.7 g. of lithium, is slowly added with stirring at 0° C. a solution of 7.5 g. of p-anisyl 3-(N-isopropylnortropane)-methyl ketone in 20 ml. of ether. Following the addition the mixture is stirred at 0° C. for one hour, and then at room temperature for four hours. Water (50 ml.) is then added and the mixture is stirred vigorously for 2 hours. The ether layer is removed and the aqueous mixture is extracted with two portions of chloroform. Evaporation of the solvents from the combined extracts gives a crystalline residue of crude product which is purified by recrystallization from ethyl acetate. In this way, 1 - (p - anisyl) - 1 - phenyl - 2 - [3 - (N - isopropylnortropane)]-ethanol is obtained as a white crystalline solid.

Example 7.—Ethyl β-(3-tropane)ethyl ketone

*Ethyl β-(3-tropane)propionate.*—To a suspension of 3.7 g. of 3-tropaneacetic acid hydrochloride (made as in Example 2) in 30 ml. of chloroform is added 4.7 g. of thionyl chloride and the resulting mixture is heated at reflux temperature for 2.5 hours. The solvent and excess thionyl chloride are evaporated in vacuo and the last traces of the latter removed from the solid residue by successive addition and removal by distillation in vacuo of two 50 ml. portions of benzene. In this way, the acid chloride hydrochloride is obtained as a brown powder.

The acid chloride hydrochloride is suspended in 30 ml. of methylene chloride and the mixture is added in portions to a solution of diazomethane, prepared in the usual way from 14.7 g. of N-methyl-N-nitroso-N'-nitroguanidine, in 200 ml. of methylene chloride kept at 0° C. After storage of the mixture at room temperature for two hours, the solvent is evaporated in vacuo to give diazomethyl 3-tropanemethyl ketone as a hygroscopic brown powder.

The diazo ketone is dissolved in 35 ml. of absolute ethanol and the solution maintained at 50–60° C. while a suspension of silver oxide, freshly prepared from 10 ml. of 10% silver nitrate solution, in 30 ml. of dry ethanol is added over a 45 min. period. After the addition the mixture is refluxed for 30 min. and then filtered. By distillation of the filtrate in vacuo, ethyl β-(3-tropane)-propionate is obtained.

*Ethyl β-(3-tropane)ethyl ketone.*—A solution of ethyl magnesium bromide in 35 ml. of ether is prepared in the usual way from 1.3 g. of magnesium and 6.4 g. of ethyl bromide. To the stirred solution, cooled to 0° C., is slowly added 3 g. of ethyl β-(3-tropane)propionate dissolved in 30 ml. of ether. The mixture is stirred 4 hours, then cooled to 0° C. and a solution of 45 g. of the sodium salt of ethylenediamine tetraacetic acid in 58 ml. of water is slowly added. The ether layer is removed and the aqueous phase is extracted with several portions of ether. Distillation of the ether extracts under reduced pressure gives ethyl β-(3-tropane)ethyl ketone as a colorless liquid; B. P. 105–109° (0.35 mm.); $n_D^{25}$ 1.4870. The picrate of the amino ketone melts at 123–124.5° C. after recrystallization from alcohol.

*1 - ethyl - 1 - (2 - pyridyl) - 3 - (3 - tropane)propanol.*— Exemplifying utility as an intermediate, a solution of n-butyl lithium in 15 ml. of ether is prepared in the usual way from 1.9 g. of n-butyl chloride and 0.35 g. of lithium. With stirring the solution is cooled to −45° C. and 2.8 g. of 2-bromopyridine dissolved in 5 ml. of ether is added slowly. After the addition the mixture is stirred 10 minutes and 1.1 g. of ethyl β-(-tropane)ethyl ketone dissolved in 15 ml. of ether is added slowly. The mixture is then stirred 15 minutes at −15° C. Water (25 ml.) is added slowly and the mixture is stirred vigorously for 45 minutes. The ether layer is removed and the aqueous phase is stirred vigorously with an equal volume of chloroform until two clear layers result. By evaporation in vacuo of the solvents from the combined extracts the product is obtained as a yellow oil which crystallizes when stirred with a small volume of ether. Recrystallization of the product form ethyl acetate gives 1-ethyl-1-(2-pyridyl)-3-(3-tropane)-propanol as a while crystalline solid.

Example 8.—p-Tolyl γ-(3-tropane)propyl ketone

*3-(3-tropane)-propanol.*—To a stirred solution of 3 g. of lithium aluminum hydride in 200 ml. of ether is added a solution of 17.8 g. of ethyl β-(3-tropane)propionate (made as in Example 7) in 50 ml. of ether at such a rate that steady reflux of ether is maintained. After the mixture is stirred at reflux temperature for three hours, it is cooled to 0° C. and 7.2 ml. of water is added gradually. The resulting mixture is stirred for two hours, filtered and the collected solid is washed with ether. Distillation of the ether solution in vacuo gives 3-(3-tropane)propanol boiling at 128–131° C. (2 mm.).

*1-chloro-3-(3-tropane)propane.*—To a solution of 7.7 g. of 3-(3-tropane)propanol in 30 ml. of chloroform is slowly added 10 g. of thionyl chloride. The reaction mixture is heated at gentle reflux for 45 minutes and then evaporated to dryness in vacuo. The residue of crude 1-chloro-3-(3-tropane)propane hydrochloride is treated with potassium carbonate solution and the oily base which forms is extracted with ether. Distillation of the ether solution gives 1-chloro-3-(3-tropane)propane boiling at 100–102° C. (1 mm.).

*γ-(3-tropane)butyronitrile.* — 1-chloro-3-(3-tropane)-propane (5 g.) and 0.1 g. of sodium iodide is added to a solution of 5 g. of potassium cyanide in a mixture of 18 ml. of alcohol and 8 ml. of water. The resulting solution is heated at reflux temperature for 18 hours and then evaporated in vacuo. Sodium hydroxide solution is added to the residual mixture of oil and solid and the oil is separated by extraction with ether. Distillation of the ether solution under reduced pressure gives γ-(3-tropane)-butyronitrile boiling at 132–135° (0.3 mm.).

*Ethyl γ-(3-tropane)butyrate.*—A solution of 3 g. of γ-(3-tropane)-butyronitrile in 15 ml. of 37% hydrochloric acid is heated at reflux temperature for several hours and then evaporated to dryness in vacuo. The solid residue is dissolved in 35 ml. of absolute ethanol, 0.5 ml. of concentrated sulfuric acid is added, and the resulting solution is heated at reflux temperature for 7 hours. The mixture is concentrated in vacuo and the residue is treated with 40% sodium hydroxide solution. The oil which separates is removed by extraction with ether and purified by distillation under reduced pressure. In this way, ethyl γ-(3-tropane)-butyrate distilling at 115–119° C. (0.5 mm.) is obtained.

*p-Tolyl γ-(3-tropane)-propyl ketone.*—A solution of p-tolyl magnesium bromide in 40 ml. of ether is prepared in the usual way from 5.1 g. of p-bromotoluene and 0.75 g. of magnesium. To the stirred solution, cooled to 0° C., is slowly added a solution of 2.3 g. of ethyl γ-(3-tropane)-butyrate in 10 ml. of ether. After the addition the mixture is stirred at room temperature for one hour and then at reflux temperature for 2 hours. The mixture is cooled to 0° C. and a solution of 27 g. of the sodium salt of ethylenediaminetetraacetic acid in 36 ml. of water is added slowly with stirring. The ether layer is removed and the aqueous layer is extracted with several portions of ether. Distillation of the ether extracts under reduced pressure gives p-tolyl γ-(3-tropane)propyl ketone boiling at 188–192° C. (0.2 mm.).

*1-(2-pyridyl)-1-p-tolyl-4-(3-tropane)butanol.* — Exemplifying utility as an intermediate, a solution of n-butyl lithium in 15 ml. of ether is prepared in the usual way from 1.9 g. of n-butyl chloride and 0.35 g. of lithium. With stirring the solution is cooled to −45° C. and 2.8 g. of 2-bromopyridine dissolved in 5 ml. of ether is added slowly. After the addition the mixture is stirred 10 minutes and 1.5 g. of p-tolyl γ-(3-tropane)-propyl ketone dissolved in 15 ml. of ether of added slowly. The mixture is then stirred 15 minutes at −15° C. Water (25 ml.) is added slowly and the mixture is stirred vigorously for 30 minutes. The ether layer is removed and the aqueous layer is stirred vigorously with an equal volume of chloroform until two clear layers result. Evaporation in vacuo of the solvents from the combined ether and chloroform solutions gives a yellow oil which crystallizes when stirred with a mixture of ether and petroleum ether. By recrystallization of the product from a mixture of ethyl acetate and petroleum ether 1-(2-pyridyl)-1-p-tolyl-4-(3-tropane) butanol is obtained as a white crystalline solid.

*Example 9.—Cyclopentyl 3-(3-tropane)propyl ketone*

*3-(3-tropane)propanol.*—To a stirred solution of 3 g. of lithium aluminum hydride in 200 ml. of ether is added a solution of 17.8 g. of ethyl β-(3-tropane)propionate (prepared as in Example 7) in 50 ml. of ether at such a rate that steady reflux of ether is maintained. After the mixture is stirred at reflux temperature for three hours, it is cooled to 0° C. and 7.2 ml. of water is added gradually. The resulting mixture is stirred for two hours, filtered and the collected solid is washed with ether. Distillation of the ether solution in vacuo gives 3-(3-tropane)-propanol boiling at 128–131° C. (2 mm.).

*1-chloro-3-(3-tropane)propane.*—To a solution of 7.7 g. of 3-(3-tropane)propanol in 30 ml. of chloroform is slowly added 10 g. of thionyl chloride. The reaction mixture is heated at gentle reflux for 45 mintes and then evaporated to dryness in vacuo. The residue of crude 1-chloro-3-(3-tropane)propane hydrochloride is treated with potassium carbonate solution and the oily base which forms is extracted with ether. Distillation of the ether solution gives 1-chloro-3-(3-tropane)propane boiling at 100–102° C. (1 mm.).

*γ-(3-tropane)butyronitrile.* — 1-chloro-3-(3-tropane)-propane (5 g.) and 0.1 g. of sodium iodide is added to a solution of 5 g. of potassium cyanide in a mixture of 18 ml. of alcohol and 8 ml. of water. The resulting solution is heated at reflux temperature for 18 hours and then evaporated in vacuo. Sodium hydroxide solution is added to the residual mixture of oil and solid and the oil is separated by extraction with ether. Distillation of the ether solution under reduced pressure gives γ-(3-tropane)butyronitrile boiling at 132–135° (0.3 mm.).

*Ethyl γ-(3-tropane)butyrate.*—A solution of 3 g. of γ-(3-tropane)-butyronitrile in 15 ml. of 37% hydrochloric acid is heated at reflux temperature for three hours and then evaporated to dryness in vacuo. The solid residue is dissolved in 35 ml. of absolute ethanol, 0.5 ml. of concentrated sulfuric acid is added, and the resulting solution is heated at reflux temperature for 7 hours. The mixture is concentrated in vacuo and the residue is treated with 40% sodium hydroxide solution. The oil which separates is removed by extraction with ether and purified by distillation under reduced pressure. In this way, ethyl γ-(3-tropane)-butyrate distilling at 115–119° C. (0.5 mm.) is obtained.

*Cyclopentyl 3-(3-tropane)propyl ketone.*—A solution of cyclopentyl magnesium bromide in 350 ml. of ether is prepared in the usual way from 5.8 g. of magnesium and 37 g. of cyclopentyl bromide. To the stirred solution cooled to 0° C. is added slowly 14.3 g. of ethyl γ-(3-tropane)butyrate (prepared by the above procedure) dissolved in 30 ml. of ether. The mixture is stirred at 0° C. for one hour and then heated at reflux temperature for 3 hours. The mixture is then cooled to 0° C. and a solution of 242 g. of the sodium salt of ethylenediamine tetraacetic acid in 300 ml. of water is added slowly with stirring. The ether layer is removed and the aqueous phase is extracted with several portions of ether. Distillation of the ether extract under reduced pressure gives cyclopentyl 3-(3-tropane)propyl ketone boiling at 152–156° C. (0.8 mm.).

*Example 10.—3-acetyltropane*

*Methyl 3-(3-acetoxytropane)carboxylate (α-ecgonine acetate).*—A solution of 10 g. of methyl 3-(3-hydroxytropane)carboxylate (methyl α-ecgonine) (Willstatter, Ber. 29, 1575 (1896)) in 50 ml. of acetic anhydride is heated to 100° C. for 4 hours. The excess acetic anhydride and acetic acid are removed in vacuo and the residue poured into ice water. The mixture is saturated with potassium carbonate and the product extracted with ether. After evaporation of ether the crude methyl 3-(3-acetoxytropane)carboxylate is purified by distillation; B. P. 162–165° C. (15 mm.); M. P. 66–67° C. The picrate after recrystallization from alcohol-water mixture melts at 215–217° C.

*Methyl 3-(2-tropene)carboxylate.*—Methyl 3-(3-acetoxytropane)carboxylate (20 g.) is added dropwise over a 7 min. period to a vertical Pyrex tube (25 mm. diameter), packed for a length of 8 in. with ¼ to ½ in. pieces of Pyrex tubing of 7 mm. diameter, and heated at 420° C. During the addition, the apparatus is swept out with nitrogen. The product, collected by means of an efficient condenser at the bottom of the tube, is dissolved in dilute hydrochloric acid and the mixture is extracted with three portions of ether. The aqueous acid solution is saturated with potassium carbonate and the product removed by extraction with ether. Distillation of the ether solution gives methyl 3-(2-tropene)-carboxylate as a pale yellow liquid, B. P. 131–134° C. (15 mm.); $n_D^{25.5}$ 1.4998. The picrate after recrystallization from water melts at 207–208° C.

*Methyl 3-tropanecarboxylate.*—Methyl 3-(2-tropene)-carboxylate (13 g.) dissolved in 100 ml. of methanol is hydrogenated over 5 g. of Raney nickel catalyst at 50 p. s. i. pressure at room temperature until hydrogen absorption ceases. Distillation of the mixture, after removal of the catalyst by filtration, gives methyl 3-tropanecarboxylate as a colorless liquid, B. P. 128–132° C. (18 mm.); $n_D^{25}$ 1.4819. The picrate of the base after recrystallization from water, melts at 171–172° C.

*3-tropanecarboxylic acid hydrochloride.*—By refluxing a solution of 5 g. of methyl 3-tropanecarboxylate made as above in 50 cc. of a concentrated hydrochloric acid for several hours and then evaporating the solution to dryness in vacuo, the hydrochloride of 3-tropanecarboxylic acid is obtained.

*3-acetyltropane.*—A solution of methyl lithium in 110 ml. of ether is prepared in the usual way under nitrogen from 21.3 g. of methyl iodide and 2.1 g. of lithium. In one portion 10.3 g. of 3-tropanecarboxylic acid hydrochloride, made following the above procedure, is added and the mixture is heated to reflux temperature with stirring. The heat source is removed and the mixture allowed to reflux spontaneously until the reaction subsides. Heating and stirring are then continued for nine hours. The mixture is cooled to 0° C. and decomposed by the slow addition of 50 ml. of water. The ether layer is removed, the aqueous layer extracted with ether and the ether extracts are dried over sodium sulfate. Distillation of the ether extract under reduced pressure gives 3-acetyltropane as a colorless liquid, B. P. 118–120° C. (10 mm.).

*Example 11.—1-hexyl 3-(n-isopropylnortropane)methyl ketone*

*Methyl 3-(N-isopropylnortropane)acetate.*—A mixture of 16.7 g. of N-isopropylnortropinone, 11.3 g. of ethyl cyanoacetate, 1.6 g. of ammonium acetate, 7.3 g. of acetic acid, 20 ml. of absolute ethanol and 0.6 g. of palladium on charcoal catalyst is shaken under hydrogen at 60 p. s. i. and 60° C. Hydrogenation is interrupted when one mole equivalent of hydrogen has been absorbed. After removal of the catalyst, the solution is evaporated in vacuo on a warm water bath. The oily residue is dissolved in concentrated hydrochloric acid and the solution is extracted with several portions of ether. The aqueous acid solution is refluxed 12 hours, evaporated in vacuo, and the residue is dried by successive addition and removal by distillation of dry benzene. The crude 3-(N-isopropylnortropane)acetic acid hydrochloride so obtained is esterified by allowing its solution in 100 ml. of anhydrous methanol saturated with hydrogen chloride to stand 3 days at room temperature. Most of the methanol is distilled under reduced pressure, cold concentrated potassium hydroxide solution is added to the residue, and the product is removed by extraction with ether. Distillation of the ether solution in vacuo gives methyl 3-(N-isopropylnortropane)-acetate as a colorless oil distilling at 124–127° C. (0.3 mm.).

*1-hexyl 3-(N-isopropylnortropane)methyl ketone.*—An ether solution of n-hexyl magnesium bromide is prepared in the usual way from 7 g. of magnesium and 52 g. of n-hexyl bromide. To the stirred solution cooled to 0° C. is added slowly 16 g. of methyl 3-(N-isopropylnortropane)acetate (made following the procedure above) dissolved in 35 ml. of ether. The mixture is stirred at 0° C. for 0.5 hour and then at room temperature for 3 hours. The mixture is cooled to 0° C. and a solution of 290 g. of the sodium salt of ethylene diamine tetraacetic acid in 350 ml. of water is added slowly with stirring. The ether layer is removed and the aqueous mixture is extracted with several portions of ether. Distillation of the ether extract in vacuo gives 1-hexyl 3-(N-isopropylnortropane)-methyl ketone boiling at 160°–164° C. (0.8 mm.).

*Example 12.—Ethyl β-(3-tropane) ethyl ketone citrate*

To an ethanolic solution of 0.21 g. of ethyl β-(3-tropane)-ethyl ketone, made as in Example 7, is added 0.19 g. of citric acid. By evaporation of the solution to dryness in vacuo the citrate salt of the ketone base is obtained.

*Example 13.—Cyclohexyl 3-tropanemethyl ketone methobromide*

By allowing a solution of one gram of cyclohexyl 3-tropane-methyl ketone, made as in Example 4, and excess methyl bromide in acetone to stand at room temperature for several hours, the methobromide salt is obtained as a white crystalline solid. The salt melts at 297–299° C. after recrystallization from ethanol-ether.

*Example 14.—Phenyl 3-tropanemethyl ketone metho-P-toluenesulfonate*

A solution of one gram of phenyl 3-tropanemethyl ketone, made as in Example 2, and excess methyl p-toluenesulfonate in 10 ml. of acetone is heated at reflux temperature for five minutes. By addition of ether to the cooled solution the quaternary ammonium salt of the ketone base is precipitated as a white crystalline solid, M. P. 145–147° C.

The compounds of Formulas 3 and 4 are the subject matter of my copending applications Serial No. 519,647 filed July 1, 1955 and Serial No. 519,649 filed July 1, 1955, respectively and reference may be made thereto for further examples of these compounds as well as for methods of their preparation.

It is not desired to be limited except as set forth in the following claims.

What is claimed is:

1. Compounds of the class consisting of a free base and the acid addition and quaternary ammonium salts thereof, the free base having the following formula:

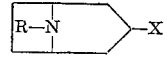

in which R is a lower alkyl radical and X is selected from the group consisting of —COR₂; —CH₂COR₂ and —CH₂CH₂COR₂; R₂ being selected from the group consisting of lower alkyl, 2-thienyl, cycloalkyl-alkyl having 6 to 10 carbon atoms, cyclopentyl, cyclohexyl, phenyl, phenyl substituted with an alkyl group having 1 to 4 carbon atoms and phenyl substituted with an alkoxy group having 1 to 4 carbon atoms.

2. 2-thienyl 3-tropane ketone.
3. Phenyl 3-tropanemethyl ketone.
4. Cyclohexyl 3-tropanemethyl ketone.
5. Cyclohexyl 3-tropanemethyl ketone methobromide.
6. Phenyl 3-tropanemethyl ketone metho-p-toluenesulfonate.

No references cited.